(12) United States Patent
Lütze

(10) Patent No.: US 8,511,627 B2
(45) Date of Patent: Aug. 20, 2013

(54) APPARATUS FOR ARRANGING AND FASTENING ELECTRICAL UNITS IN PARTICULAR IN A SWITCHGEAR CABINET, AND A FITTING SYSTEM WITH SUCH AN APPARATUS

(75) Inventor: Udo Lütze, Kernen-Stetten (DE)

(73) Assignee: Friedrich Lütze GmbH, Weinstadt (DE)

( * ) Notice: Subject to any disclaimer, the term of this patent is extended or adjusted under 35 U.S.C. 154(b) by 622 days.

(21) Appl. No.: 12/452,146

(22) PCT Filed: May 15, 2008

(86) PCT No.: PCT/EP2008/003886
§ 371 (c)(1),
(2), (4) Date: Dec. 17, 2009

(87) PCT Pub. No.: WO2009/012830
PCT Pub. Date: Jan. 29, 2009

(65) Prior Publication Data
US 2010/0116945 A1    May 13, 2010

(30) Foreign Application Priority Data
Jul. 25, 2007 (DE) .......................... 10 2007 034 600

(51) Int. Cl.
*A47F 5/00* (2006.01)
(52) U.S. Cl.
USPC ............ 248/223.41; 248/225.11; 248/222.52; 211/70.6
(58) Field of Classification Search
USPC ............ 248/223.41, 223.51, 223.61, 222.51, 248/222.52, 225.11; 211/94.01, 70.6
See application file for complete search history.

(56) References Cited

U.S. PATENT DOCUMENTS

| | | | | |
|---|---|---|---|---|
| 4,591,058 A | * | 5/1986 | Amstutz et al. | 211/94.01 |
| 4,629,076 A | * | 12/1986 | Amstutz et al. | 211/94.01 |
| 5,360,121 A | * | 11/1994 | Sothman | 211/87.01 |
| 5,484,067 A | * | 1/1996 | Sothman | 211/87.01 |
| 5,944,294 A | * | 8/1999 | Baer | 248/220.43 |
| 6,654,255 B2 | | 11/2003 | Kruse et al. | |
| 7,703,589 B2 | * | 4/2010 | Kalitzki | 191/32 |

FOREIGN PATENT DOCUMENTS

| | | |
|---|---|---|
| DE | 37 40 925 A1 | 6/1989 |
| DE | 102 55 490 A1 | 7/2004 |
| DE | 10 2005 053 549 A1 | 5/2007 |
| EP | 0 241 318 A2 | 10/1987 |
| FR | 2 242 793 A1 | 3/1975 |
| FR | 2 791 515 A1 | 9/2000 |
| GB | 2 263 933 A | 8/1993 |

* cited by examiner

*Primary Examiner* — Steven Marsh
(74) *Attorney, Agent, or Firm* — Roylance, Abrams, Berdo & Goodman LLP

(57) ABSTRACT

An apparatus (10) for arranging and fastening electrical units (152, 154, 156), in particular in a switch gear cabinet (1), has a mount element (14). On the fitting side of the mounting element, a module mount (150) with at least one electrical unit (152, 154, 156) can be fastened. The mount element (14) has a groove (16) extending in a longitudinal direction and open towards the fitting side. The module mount (150) can be suspended in the groove in an optional position in the longitudinal direction of the groove (16). The groove (16) is shaped such that, owing to the force of the weight acting on the suspended module mount (150), the module mount (150) is arranged on the mount element (14).

16 Claims, 6 Drawing Sheets

APPARATUS FOR ARRANGING AND FASTENING ELECTRICAL UNITS IN PARTICULAR IN A SWITCHGEAR CABINET, AND A FITTING SYSTEM WITH SUCH AN APPARATUS

FIELD OF THE INVENTION

The invention relates to an apparatus for arranging and fastening electrical units, in particular in a switchgear cabinet, and a fitting system with that apparatus.

BACKGROUND OF THE INVENTION

Electrical units for industrial control engineering are frequently located in switchgear cabinets or switchboxes. The units are fixed on a mounting rail, for example a top-hat rail or C-rail. EP 0902 513 A2 discloses a device for fastening and wiring a plurality of electrical units.

In some applications, instead of individual electrical units, prefabricating complete function modules with generally several electrical units located on a module mount and fastening these module mounts subsequently to a generic apparatus in the switchgear cabinet is advantageous. EP 1 502 340 B1 discloses a fitting system in which in one wall of the switchgear cabinet at a given distance to one another, holes are provided into which the modules can be plugged. The position of the modules on the cabinet wall is permanently dictated by the position of the holes. The optionally large and also heavy modules must be plugged exactly into these holes.

DE 102 55 490 A1 discloses a retaining device and a fitting system for devices in which the individual parts can be fastened with a simple tool. The devices are hooked into a retaining device and are fixed on the retaining device by fasteners.

DE 10 2005 053 549 A1 discloses a system for holding cables in cable ducts. The cable ducts are positively connectable to cable duct holders. The cable duct holder is connectable to a mounting channel.

GB 2 263 933 A discloses a clip of U-shaped spring steel that can be clipped into a ceiling structure or the line and can be fixed on a line guide.

EP 0 241 318 A2 discloses a low voltage distributor system with an internal and an external conductor rail. The electrical terminal adapter can be positioned at an optional position along the conductor rails. The conductor rails can make contact with the terminal adapter.

U.S. Pat. No. 6,654,255 B2 discloses a fitting system for arrangement and fastening of data communications devices. The data communications devices can be suspended in a groove formed by the fitting plate by a hanger formed by its housing.

SUMMARY OF THE INVENTION

An object of this invention is to provide an apparatus for arranging and fastening of electrical units, as well as the pertinent fitting system with that apparatus, that overcome the disadvantages of the prior art. In one embodiment, the arrangement and fastening of module mounts on the apparatus is simplified and the freedom of choice in the arrangement of the module mounts on the apparatus is greater.

The invention is basically achieved by an apparatus having a mount element with a groove extending in the longitudinal direction and open toward its fitting side. The module mount can be suspended in any position along the groove and can then be shifted into the desired position along the groove. In this way, fitting of the module mount is simplified. In particular, the module mount can be first suspended in the groove at a position that is not the final position, for example, in a position that is especially easily accessible. In this position, wiring and/or operating tests can also be carried out. Several module mounts can be suspended first in this or in an adjacent groove in this way and can be wired to one another before the module mount or mounts are shifted along the groove into the final fitting position.

In cross section, the groove is shaped such that in the suspended state the module mount is held on the mount element simply due to the weight acting on it and is especially protected against falling off the mount element. The mount element can have a groove or also several grooves preferably extending parallel to one another. In one embodiment, the apparatus has several such mount elements preferably arranged parallel to one another. In one embodiment, the mount element is formed by a metal profile, and the groove extends continuously over the entire length of the mount element.

Generic apparatus can generally have vertically extending mounting rails in addition to the often horizontally mounting mount elements. The mount elements are fastened either directly or using mounting brackets on the mounting rail, for example. Generally, the mounting rails together with the mount elements form a fixed frame fixed in the switchgear cabinet, for example, by the mounting rails being screwed to the switchgear cabinet.

In one embodiment, the groove is shaped such that the suspended module mount is exposed to a force acting in the direction toward the mount element by the weight acting on it. For this purpose, the groove and/or the part of the module mount suspended in the groove can have a slanted surface having an angle of less than 90° with the vertical. The module mount, when being suspended, is thereby moved into contact with the mount element by the acting weight. For dismounting, the module mount must be raised offering additional protection against unintentional dismounting.

In one embodiment, the cross section through the groove in a region spaced apart from the fitting-side opening has two legs spaced apart from one another. Depending on the arrangement of the mount element, while being suspended, the module mount is inserted into the first leg or the second leg of the groove. In this way, the same parts can be used for the mount element for suspending the module mount on its upper end and on its lower end.

The module mount can be made plate-like and, for example, can be beveled on the end side on two opposite edges. In one embodiment, the beveled sections are aligned parallel to one another. For suspension purposes, at least one beveled section of the module mount can be suspended in the groove of the pertinent mount element. Preferably, on the upper end of the module mount, a first mount element and on the lower end of the module mount, a second mount element are provided. The module mount is suspended with its beveled section located on the upper end in the first leg of the groove of the first mount element and with its beveled section located on the lower end in the second leg of the groove of the second mount element. The shape of the groove and/or the shape of the beveled section of the module mount can be selected such that spring-elastic deformation, specifically of the beveled section of the module mount, arises by suspension. By this definition suspension the module mount is pre-fixed in the groove.

In one embodiment, the two legs of the groove tend to move apart with increasing distance from the fitting-side opening.

In one embodiment, the two legs enclose an angle between 45 and 75°, specifically between 55 and 65°, and preferably 60°.

In one embodiment, the cross section through the groove is symmetrical to an axis extending in the center relative to the fitting-side opening. In one embodiment, the axis of symmetry extends at a right angle to an imaginary line connecting the two edges of the opening of the groove.

In one embodiment, the mount element toward the fitting side has openings for holding fasteners by which the suspended module mount can be fastened on the mount element. Fundamentally, threaded holes or openings can be provided into which a screw can be screwed in a fixed grid dimension on the mount element. In one embodiment, the openings for holding the fasteners are formed by a groove extending, in any case, over a certain length, preferably, over the entire length of the mount element. This arrangement has the advantage that the fasteners, specifically fastening screws, can be screwed into the groove almost anywhere. In this way the suspended module mount can be fastened at any position on the mount element. The groove can be especially easily produced when the mount element is designed as a profile.

In one embodiment, the groove on its side walls extending in a longitudinal extension is provided with channels whose extension and distance to one another can be matched to the fastener to be screwed in. This channeling of the groove reduces the force for screwing in the fasteners. The channeling can likewise be provided in the production of the mount element designed as a profile.

In one embodiment, the groove for suspending the module mount has a section for holding a slide nut that can be moved along the groove. With the slide nut, module mounts or other components that are not suspended in the groove can be fastened on the mount element.

In one embodiment, the mount element adjacent to the fitting-side opening of the groove for suspending the module mount has a contact surface for the module mount, in particular a planar contact surface. During fastening this contact surface automatically yields flat alignment of the module mount relative to the mount element.

In one embodiment, the mount element has a fastening rail for direct fastening of electrical units. The fastening rail is preferably formed in one piece by the mount element. The fastening rail can be, for example, a top-hat rail, such as a top-hat rail according to EN 50022. For example, electrical components in terminal block housings can be easily clipped onto this fastening rail and can be fastened on the mount element.

In one embodiment, the mount element preferably forms fixing means integrally for attaching a wiring comb to the mount element. By the fitting comb, electrical lines routed on the fitting side of the apparatus to the electrical units can be routed onto the back opposite the fitting side. On the back, the lines can be routed, and the electrical units can be wired.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE DRAWINGS

Figure 1:
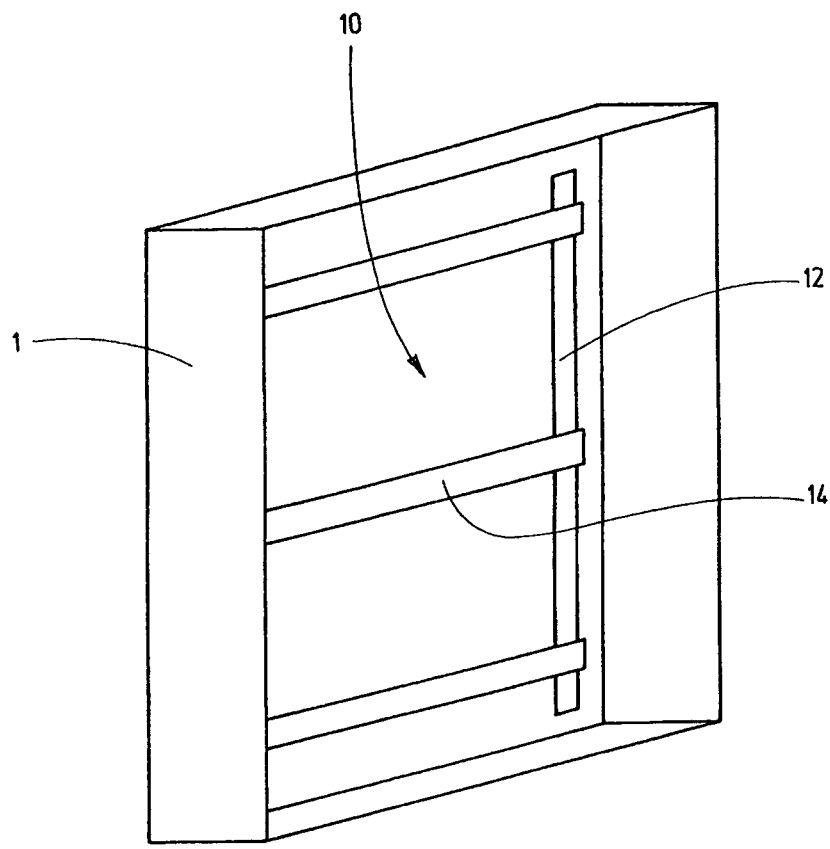
FIG. 1 is a perspective view of a switchbox or the switchgear cabinet according to an exemplary embodiment of the invention.

FIG. 1 shows a perspective view of a switchbox or switchgear cabinet 1 as is conventionally used for fitting of electrical control means, for example, in industrial production engineering. In the switchgear cabinet 1, an apparatus 10 arranges and fastens electrical units. In the illustrated embodiment, the apparatus 10 has vertically extending mounting rails 12 and horizontally extending mount elements 14 connected to them. The mount elements 14 in the embodiment are formed by elongated fitting rails. These fitting rails are produced from a profile, for example an aluminum profile, and can be cut off from an endless profile at the length required at the time.

Figure 2:
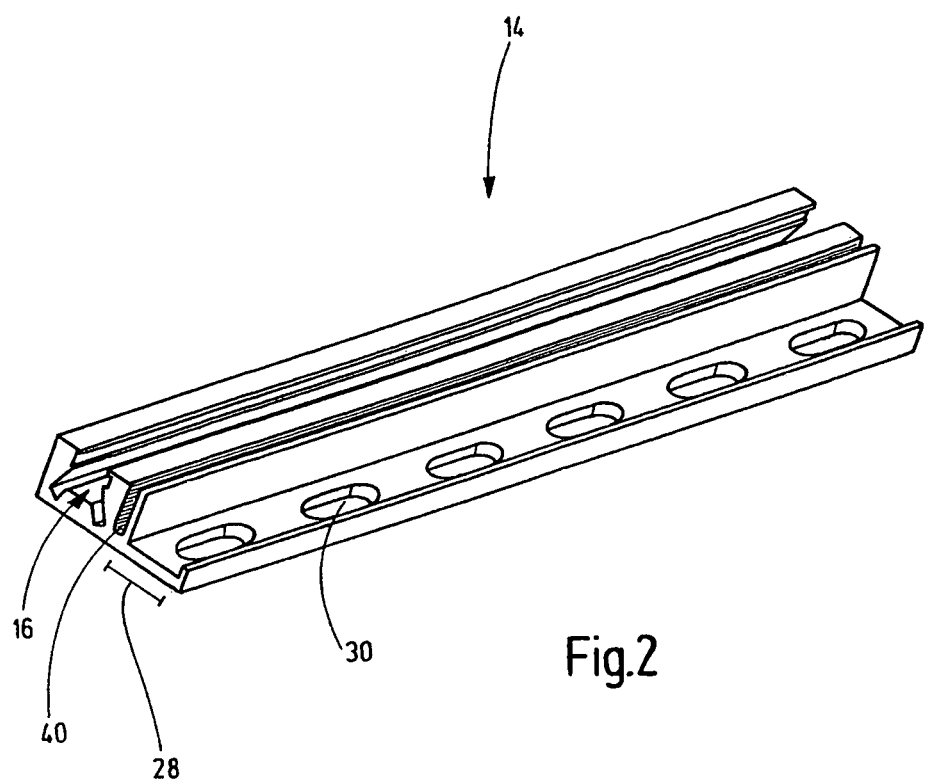
FIG. 2 is a perspective view of a mount element according to a first exemplary embodiment of the invention.
Figure 3:
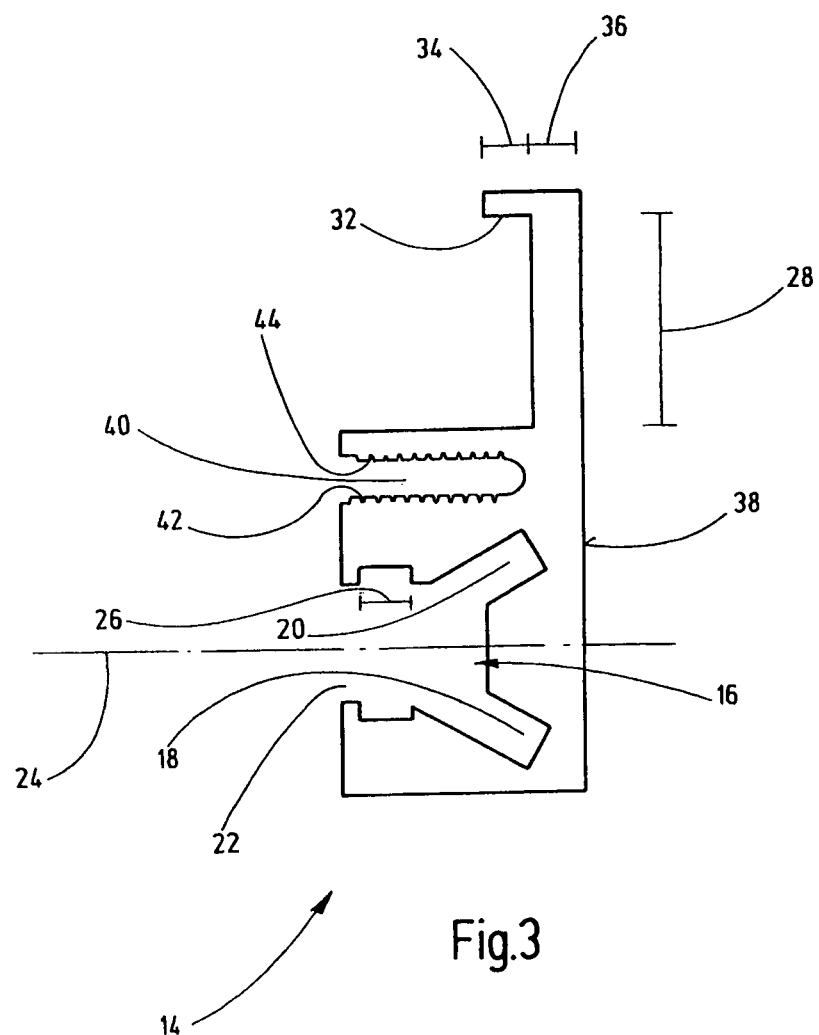
FIG. 3 is a side elevational view in section of the mount element of FIG. 2.

FIG. 2 shows a perspective view of a mount element 14, while FIG. 3 shows a cross section through the mount element 14 of FIG. 2. In the longitudinal direction, a first groove 16 extends, is more or less "Y"-shaped in cross section and is open toward the fitting side, with its section connecting the two legs 18, 20. A beveled section 158 (FIG. 5) of a module mount 150 can be suspended in this groove 16. The beveled section 158 engages one of the two legs 18, 20 formed by the groove 16. The two legs 18, 20 tend to spread apart from one another with increasing distance from the fitting-side opening 22 of the groove 16. The groove 16 is symmetrical to an axis 24 extending in the center relative to the fitting-side opening 22. The two legs 18, 20 enclose an angle between 45 and 75°, specifically between 55 and 65°, and preferably about 60°.

Between the fitting-side opening 22 and the two legs 18, 20, the groove 16 has a section 26 for holding a slide nut into which a fastening screw can be screwed from the fitting-side opening 22. The depth of the groove 16 measured between the fitting-side opening 22 and the blind hole-like end of the legs 18, 20 is at least 50% of the thickness of the mount element 14, preferably at least 80%.

On or near the longitudinal edge away from the groove 16, the mount element 14 forms a strip-shaped section 28. In the longitudinal direction, successive and preferably equally spaced openings, preferably slots 30, are in section 28. By the opening, the mount element 14 can be fastened to other components, in particular, to the mounting rails 12 or directly to the switchgear cabinet 1. The mount element 14 following the strip-shaped section 28 has a drawn-up edge 32. The height 34 of the edge 32 is between 50 and 200%, preferably between 80 and 120% of the thickness 36 of the mount element 14 in the region of the strip-shaped section 28. The thickness of the mount element 14 remaining between the blind hole-shaped end of the legs 18, 20 and the opposite planar surface 38 is likewise between 50 and 200% of the thickness of the mount element 14 in the strip-shaped section 28.

Between the groove 16 and the strip-shaped section 28, the mount element 14 has another or second groove 40 parallel to the groove 16. The other groove 40 on its bottom surface in cross section is rounded semicircularly. On its opening present toward the fitting side, groove 40 has a step-shaped widening. Between the fitting-side opening and the bottom surface, in the groove channels 42, 44 extend in the longitudinal direction of the mount element 14. These channels 42, 44 are designed to simplify the screwing-in of the fastening screws. By those fastening screws a module mount 150 suspended in the groove 16 can be fixed on the mount element 14. The channels 42, 44 of one side wall are equidistant and arranged parallel to one another. The first channels 42 of one side wall of the other groove 40 relative to the second channels 44 on the opposite side wall have an offset of 50% of the grid dimension of the first and second channels 42, 44.

Fundamentally, screws with, for example, a metric thread can be screwed into this fluted groove 40. In particular, when not only mechanical fastening, but also an electric connection between the fastening screw and therefore the module mount 150 and the mount element 14 are to be established by screwing in the fastening screws, self-tapping screws can also be used, such as, for example, sheet metal screws. Especially in the use of aluminum profiles for the mount element 14, these screws penetrate the electrically insulating layers present on the surface and establish reliable electrical contact. The thickness remaining between the bottom surface of the other groove 40 and the opposite flat surface 38 is between 100 and 300% of the thickness 36 of the mount element 14 in the strip-shaped section 28, specifically, between 100 and 200%.

Figure 4:
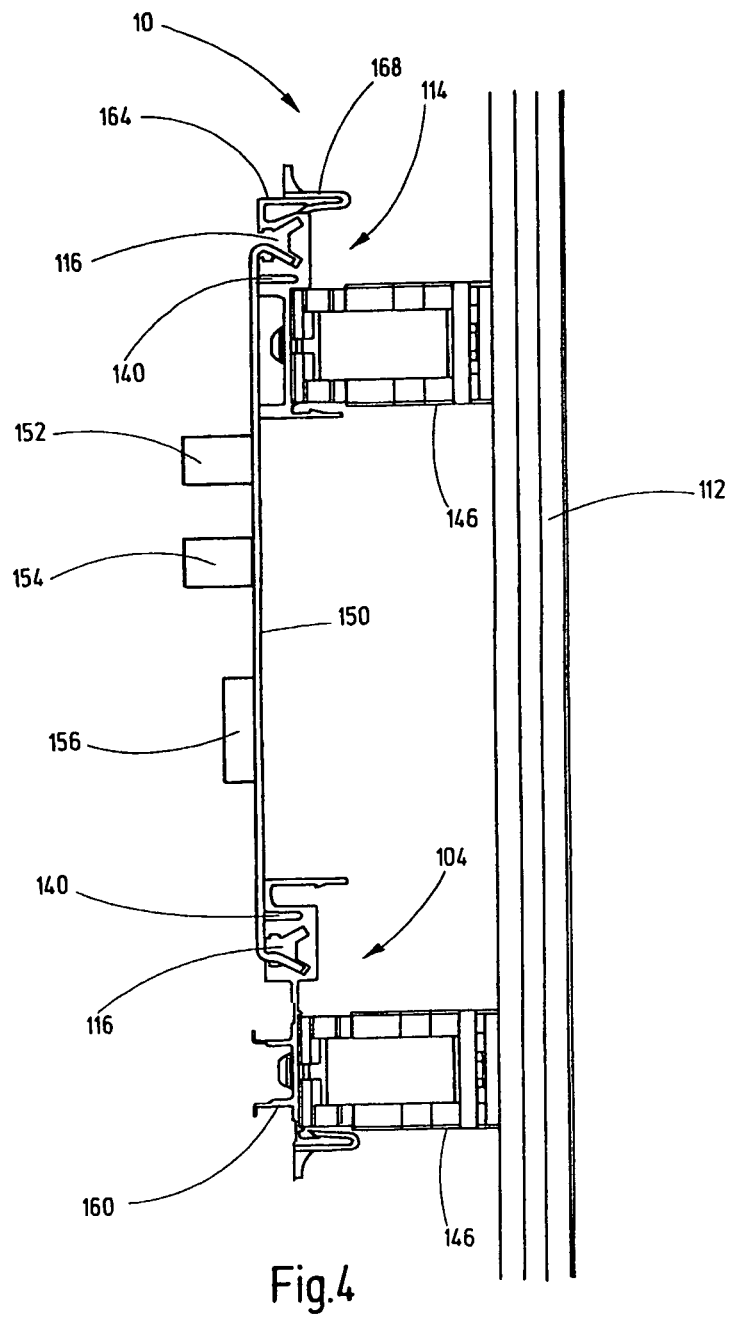
FIG. 4 is a side elevational view of an apparatus according to a second exemplary embodiment according to the invention.
Figure 5:
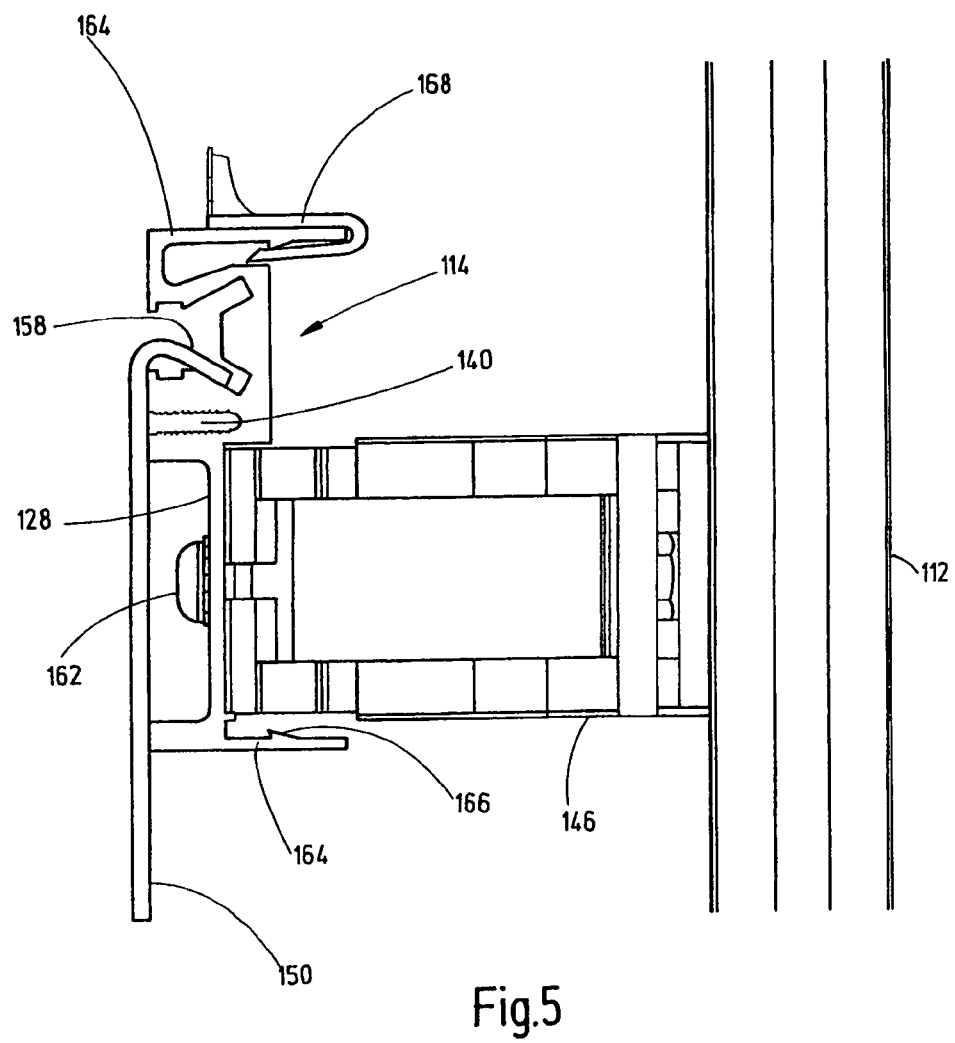
FIG. 5 is an enlarged partial side elevational view of the apparatus of FIG. 4.

FIG. 4 shows another or second embodiment of the apparatus 10 according to the invention. Two different mount elements 104, 114 are fastened to the mounting rail 112 by respective mounting brackets 146. FIG. 5 shows an enlargement of an extract of FIG. 4 with mount element 114.

Both mount elements 104, 114 have a first groove 116 and another or second groove 140. On a module mount 150 produced, for example, from a metal sheet, one or more electrical units 152, 154, 156 can be mechanically fastened and optionally also electrically connected to one another and/or to other electrical units located on the apparatus 10. One advantage of using such a module mount 150 is that the electrical units 152, 154, 156 can be premounted and prewired before the module mount 150 is mounted and fastened on the apparatus 10. In this way, certain installation activities can be prepared and final fitting of the electrical units 152, 154, 156 is shortened.

For arrangement purposes, the module mount 150 is suspended in the groove 116 at its top and bottom ends with each end in the leg 20 of the respective groove 116 aligned obliquely down. For this purpose, the module mount 150 at its top and bottom ends has respective beveled sections 158 parallel to one another and enclosing an angle between 45 and 75°, specifically about 60°, with the other planar section of the module mount 150 on which the electrical units 152, 154, 156 are located. The mount element 114 forms one or more planar contact surfaces for contact of the mount element 150, which contact is flat at least in certain sections. The planar contact surface is located, for example, in a region adjoining the groove 116 or between the groove 116 and the other groove 140.

Since the groove 116 extends over the entire length of the mount element 114, the module mount 150 can be suspended at any position in the longitudinal direction of the groove 116. Moreover, the module mount 150 after being suspended can still be shifted along the groove 116 until it assumes its final position. In the final position, the module mount 150 can be permanently fastened by screwing the fastening screw into the other groove 140.

The connection between the mount element 114 and the mounting bracket 146 takes place by a fastening screw 162 screwed in the strip-shaped section 128. In contrast to the embodiment of FIGS. 2 and 3, the mount element 114 of the second embodiment of FIGS. 4 and 5, on its longitudinal edges opposite one another, has a crosspiece 164. On its side facing the mount element 114, crosspiece 164 preferably forms in one piece a catch projection 166 onto which a cable comb 168 can be detachably clipped. By comb 168, electrical lines from the fitting side and, in particular, from the side on which the electrical units 152, 154, 156 on the module mount 150 are located can be routed onto the back of the mount element 114, particularly into the region located between the module mount 150 and the mounting rail 112 in which the line can be routed.

The other mount element 104 (FIG. 4) integrally forms a fastening rail 160 extending in the longitudinal direction of the other mount element 104, in particular a top-hat rail. On this fastening rail 160 other electrical units, for example units accommodated in terminal block housings can be mounted. Therefore, an electrical unit located on such fastening rail 160 can be connected by a short connecting line to an electrical unit 152, 154, 156 located on the adjacent module mount 150.

Figure 6:
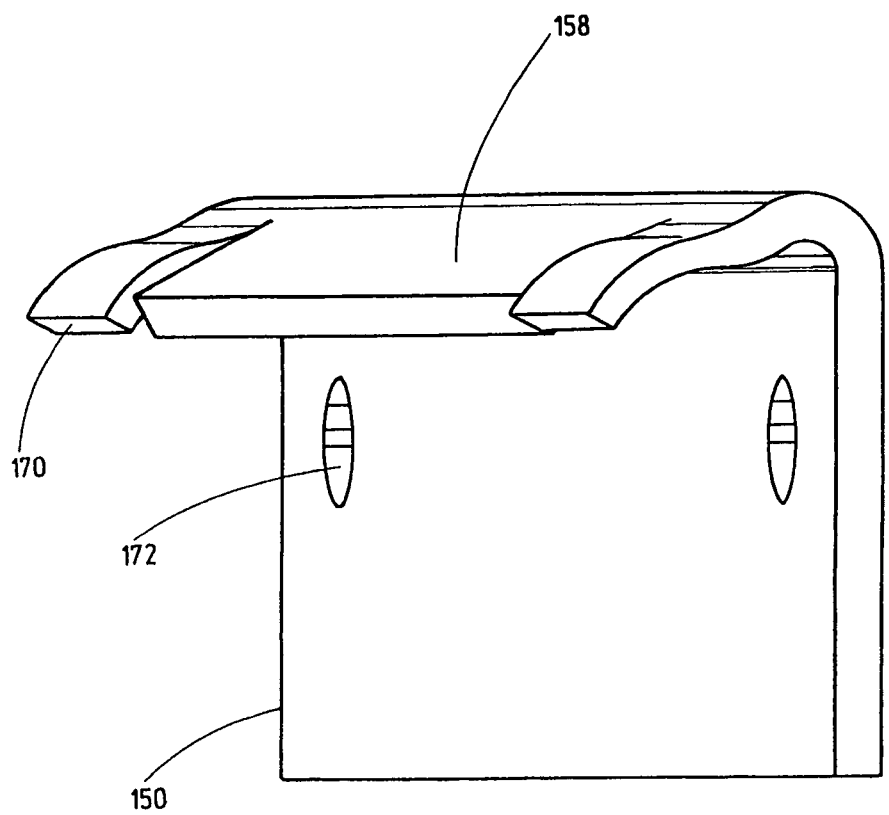
FIG. 6 is an enlarged partial perspective view of part of the beveled section of the module mount of FIG. 4.

FIG. 6 shows an enlargement of part 170 of the beveled section 158 of the module mount 150. The part 170 located on the edge side is separated from the center beveled section 158 and is provided with a bend. In the illustrated undeformed state, part 170 projects beyond the flat contour formed by the beveled section 158. In this way, when the module mount 150 is suspended in the groove 116, part 170 can be spring-elastically deformed so that the module mount 150 locks in the groove 116. The shape of the part 170 can be chosen to match the shape of the groove 116 such that both the locking of the module mount 150 into the groove 116 and the release of this locking can take place without a tool. In this way, suspension of the module mount 150 first in the groove 116, to position it subsequently by displacement in the groove 116 and in this preselected position to lock it by final insertion of the module mount 150 in the groove 116. In addition, final fixing can take place by a fastening screw screwed into the other groove 140 and passing through holes 172 in the module mount 150.

While various embodiments have been chosen to illustrate the invention, it will be understood by those skilled in the art that various changes and modifications can be made therein without departing from the scope of the invention as defined in the appended claims.

What is claimed is:

1. An apparatus for arranging and fastening electrical units, comprising:
   a module mount with at least one electrical unit thereon;
   a first unitary and one-piece mount element having a fitting side with a groove extending in a longitudinal direction thereof and opening on said fitting side, said groove suspending said module mount on said fitting side in any longitudinal position along said groove, said groove in cross section having a fitting-side section and a pair of legs acutely angled relative to one another and extending from said fitting-side section and being spaced from said fitting side, at least one of said legs depending on an orientation of said mount element receiving said module mount such that weight of said module mount acts to maintain said module mount against falling from said mount element before being fastened thereto; and
   a slide nut holding section in said fitting-side section of said groove and being spaced from said legs.

2. An apparatus according to claim 1 wherein
   said legs are separated from one another without having a common defining surface.

3. An apparatus according to claim 1 wherein
   said legs are separated by an angle between about 45° and about 75°.

4. An apparatus according to claim 1 wherein suspension and the weight of said module mount exerts a force thereon acting in a direction of said module mount.

5. An apparatus according to claim 1 wherein spacing between said legs increases with increasing distance from said fitting side.

6. An apparatus according to claim 1 wherein said groove in cross section is symmetrical to an axis extending centrally relative to a fitting-side opening thereof.

7. An apparatus according to claim 1 wherein said mount element has fastener openings on said fitting side for receiving fasteners to fasten said module mount to said mount element.

8. An apparatus according to claim 7 wherein said fastener openings form an elongated and continuous second groove.

9. An apparatus according to claim 8 wherein said second groove comprises channels opening therein.

10. An apparatus according to claim 1 wherein said mount element comprises a fastening rail formed integrally therewith for fastening of electrical units.

11. An apparatus according to claim 1 wherein said mount element forms a fitting rail connected to a mounting rail extending at a right angle to said fitting rail and fastened in a switchgear cabinet.

12. An apparatus according to claim 1 wherein said module mount comprises a plate-shaped section supporting said electrical unit and having a first end edge with a first beveled section received in one of said legs.

13. An apparatus according to claim 12 wherein said beveled section extends from said plate shaped section at an angle of less than 90°.

14. An apparatus according to claim 12 wherein said module mount comprises a second end edge opposite said first end edge with a second beveled section received in a second mount element.

15. An apparatus according to claim 14 wherein said second mount element comprises a groove receiving said second beveled section to suspend said module mounts at said first and second end edges thereof.

16. An apparatus according to claim 12 wherein said first beveled section is resiliently deformable to detachably and frictionally retain said first beveled section in said one leg without tools.

* * * * *